US011342636B2

(12) United States Patent
Lee et al.

(10) Patent No.: US 11,342,636 B2
(45) Date of Patent: May 24, 2022

(54) SECONDARY BATTERY

(71) Applicant: Samsung SDI Co., Ltd., Yongin-si (KR)

(72) Inventors: Hyun Soo Lee, Yongin-si (KR); Jeong Won Oh, Yongin-si (KR); Sang Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 125 days.

(21) Appl. No.: 16/179,684

(22) Filed: Nov. 2, 2018

(65) Prior Publication Data
US 2019/0221825 A1    Jul. 18, 2019

(30) Foreign Application Priority Data
Jan. 17, 2018    (KR) .................... 10-2018-0006230

(51) Int. Cl.
*H01M 50/54* (2021.01)
*H01M 10/0525* (2010.01)
*H01M 50/531* (2021.01)
*H01M 50/538* (2021.01)

(52) U.S. Cl.
CPC ....... *H01M 50/54* (2021.01); *H01M 10/0525* (2013.01); *H01M 50/531* (2021.01); *H01M 50/538* (2021.01); *H01M 2220/30* (2013.01)

(58) Field of Classification Search
CPC ........ H01M 2/266; H01M 2/26; H01M 2/263; H01M 50/54; H01M 50/538; H01M 50/531
See application file for complete search history.

(56) References Cited

U.S. PATENT DOCUMENTS

| 7,883,795 | B2 | 2/2011 | Kim et al. |
| 8,808,903 | B2 * | 8/2014 | Shinoda ............... H01M 2/043 |
| | | | 429/163 |
| 9,299,964 | B2 | 3/2016 | Masuda |
| 9,601,725 | B2 | 3/2017 | Masuda |
| 9,653,714 | B2 | 5/2017 | Mori et al. |
| 2006/0068277 | A1 | 3/2006 | Kim et al. |
| 2012/0164501 | A1 | 6/2012 | Guen |
| 2012/0214050 | A1 | 8/2012 | Kim |

(Continued)

FOREIGN PATENT DOCUMENTS

CN    103137907 A    6/2013
CN    104078631 A    10/2014

(Continued)

OTHER PUBLICATIONS

EPO Extended Search Report dated Dec. 21, 2018, for corresponding European Patent Application 18205838.8 (9 pages).

(Continued)

*Primary Examiner* — Ula C Ruddock
*Assistant Examiner* — Thomas H. Parsons
(74) *Attorney, Agent, or Firm* — Lewis Roca Rothgerber Christie LLP

(57) ABSTRACT

A secondary battery includes: an electrode assembly including a main tab; a current collecting member adjacent the main tab; and a sub-tab electrically connecting the main tab to the current collecting member. The main tab is in and welded to the sub-tab, and the sub-tab and the main tab are bent in the same direction on the current collecting member.

10 Claims, 11 Drawing Sheets

(56) References Cited

U.S. PATENT DOCUMENTS

| | | | |
|---|---|---|---|
| 2013/0130100 A1 | 5/2013 | Kurata et al. | |
| 2013/0171511 A1* | 7/2013 | Masuda | H01M 2/0473 |
| | | | 429/181 |
| 2013/0330593 A1 | 12/2013 | Kim et al. | |
| 2014/0295220 A1 | 10/2014 | Mori et al. | |
| 2016/0181578 A1 | 6/2016 | Masuda | |

FOREIGN PATENT DOCUMENTS

| | | |
|---|---|---|
| CN | 204144372 U | 2/2015 |
| JP | 2000-164195 A | 6/2000 |
| JP | 2001-155711 A | 6/2001 |
| JP | 2016-225117 A | 12/2016 |
| KR | 10-0627360 B1 | 3/2006 |

OTHER PUBLICATIONS

CN Office action issued in corresponding application No. CN 201811415603.2, dated Jul. 5, 2021, 9 pages.

\* cited by examiner

SECONDARY BATTERY

CROSS-REFERENCE TO RELATED APPLICATION

This application claims priority to and the benefit of Korean Patent Application No. 10-2018-0006230, filed on Jan. 17, 2018 in the Korean Intellectual Property Office (KIPO), the content of which is incorporated herein in its entirety by reference.

BACKGROUND

1. Field

Aspects of embodiments of the present invention relate to a secondary battery.

2. Description of the Related Art

Generally, a secondary battery is designed to be recharged, while a primary battery is not designed to be recharged. Low-capacity secondary batteries having a single secondary battery packaged in the form of a pack are widely used in small, portable electronic equipment, such as mobile phones and camcorders. Large-capacity secondary batteries (e.g., secondary battery modules) having a plurality of secondary batteries assembled in the form of a module are widely used as power sources for, as one example, driving motors of hybrid or electric cars.

Secondary batteries can be configured by housing an electrode assembly, which may be formed by arranging a separator as an insulator between a positive electrode plate and a negative electrode plate, in a case together with an electrolytic solution and installing a cap plate onto the case. As one example, an electrode assembly may be formed in a jelly-roll configuration. The jelly-roll electrode assembly is configured such that a main tab (e.g., an uncoated portion of the positive or negative plate) protrudes upwardly from the electrode assembly or from left and right sides of the electrode assembly and a current collector is connected to the main tab (e.g., the uncoated portion).

The above information disclosed in this Background section is for enhancement of understanding of the background of the described technology, and therefore, it may contain information that does not form the prior art that is already known to a person of ordinary skill in the art.

SUMMARY

Example embodiments of the present invention provide a secondary battery having increased capacity by reducing or minimizing a space occupied by a main tab (e.g., an uncoated portion) between a case and an electrode assembly.

The above and other aspects and features of the present invention will be described in, or will be apparent from, the following description of example embodiments.

According to an embodiment of the present invention, a secondary battery includes: an electrode assembly including a main tab; a current collecting member adjacent the main tab; and a sub-tab electrically connecting the main tab to the current collecting member. The main tab is in and welded to the sub-tab, and the sub-tab and the main tab are bent in the same direction on the current collecting member.

The sub-tab and the main tab may be bent to extend in a direction parallel to the current collecting member.

The electrode assembly may include a plurality of first and second electrode plates and separators stacked on each other and may have a pair of long-side regions and a short-side region extending between the long-side regions. The main tab may extend from the short-side region of the electrode assembly, and the current collecting member may contact the short-side region of the electrode assembly and may have a slit through which the main tab passes.

The current collecting member may include: a first region at one side of the slit and contacting the short-side region of the electrode assembly; a second region at another side of the slit and contacting the short-side region of the electrode assembly; and a third region extending between the first and second regions and contacting the short-side region of the electrode assembly.

The sub-tab may include: a first section welded to the first region of the current collecting member; a second section welded to the second region of the current collecting member; a third section extending from the first section and welded to one surface of the main tab; and a fourth section extending from the second section and welded to another surface of the main tab.

The third and fourth sections of the sub-tab may be bent to extend in a direction parallel to the first region of the current collecting member or the second region of the current collecting member.

Ends of the third and fourth sections of the sub-tab may be coplanar with an end of the main tab.

The sub-tab may further include a fifth section extending between ends of the third and fourth sections of the sub-tab.

The sub-tab may have a greater thickness than the main tab and a smaller thickness than the current collecting member.

The electrode assembly may include a first electrode assembly including a first main tab and a second electrode assembly including a second main tab. The current collecting member may have a first slit through which the first main tab passes and a second slit through which the second main tab passes. The sub-tab may include a first holding part into which the first main tab is inserted and a second holding part into which the second main tab is inserted.

As described above, a secondary battery according to various example embodiments of the present invention may have increased capacity by reducing or minimizing a space between a case and an electrode assembly occupied by a main tab (e.g., an uncoated portion).

According to various example embodiments of the present invention, because the main tab, which extends from the electrode assembly, is close to or is combined with (e.g., contacts) the case when it is bent toward a side portion of the electrode assembly, a space within the case occupied by the main tab of the electrode assembly can be reduced or minimized such that the size of the electrode assembly can be increased, thereby providing a secondary battery having increased capacity.

For example, because a current collecting member, which electrically connects the electrode assembly to a terminal part, is in close contact with the side portion of the electrode assembly, and because the main tab, which passes through the current collecting member to be inserted into and welded to the sub-tab, is then bent to put it in close contact with the current collecting member, a space (e.g., a dead space or dead volume) between the case and the electrode assembly is considerably reduced, thereby providing a secondary battery having increased capacity.

DETAILED DESCRIPTION

Figure 1:
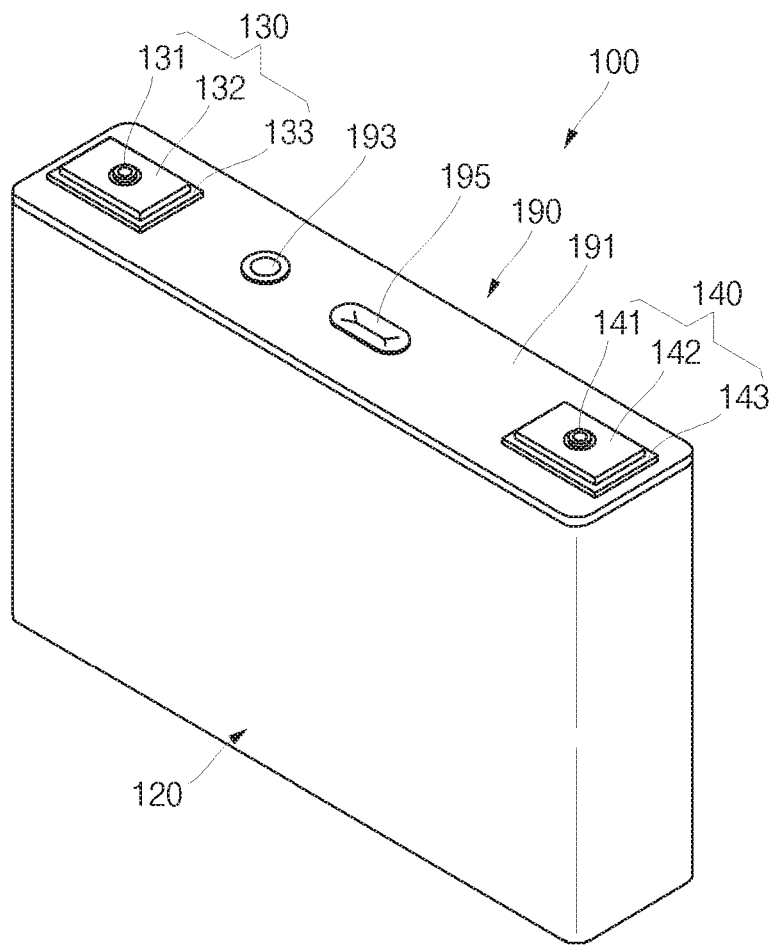
FIG. 1 is a perspective view of a secondary battery according to an embodiment of the present invention.

Hereinafter, example embodiments of the present invention will be described in more detail.

The present invention may be embodied in many different forms and should not be construed as being limited to the example embodiments set forth herein. Rather, these example embodiments of the disclosure are provided so that this disclosure will be thorough and complete and will convey the inventive concepts of the disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. Further, the use of "may" when describing embodiments of the present invention relates to "one or more embodiments of the present invention." In addition, it will be understood that when an element A is referred to as being "connected to" or "coupled to" an element B, the element A can be directly connected or coupled to the element B or an intervening element C may be present therebetween such that the element A and the element B are indirectly connected or coupled to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" or "include" and variations thereof, such as "comprising" or "including," when used in this specification, specify the presence of stated features, numbers, steps, operations, elements, and/or components but do not preclude the presence or addition of one or more other features, numbers, steps, operations, elements, components, and/or groups thereof. As used herein, the term "substantially," "about," and similar terms are used as terms of approximation and not as terms of degree, and are intended to account for the inherent variations in measured or calculated values that would be recognized by those of ordinary skill in the art.

It will be understood that, although the terms first, second, etc. may be used herein to describe various members, elements, regions, layers, and/or sections, these members, elements, regions, layers, and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" can encompass both an orientation of above and below.

Figure 2A:
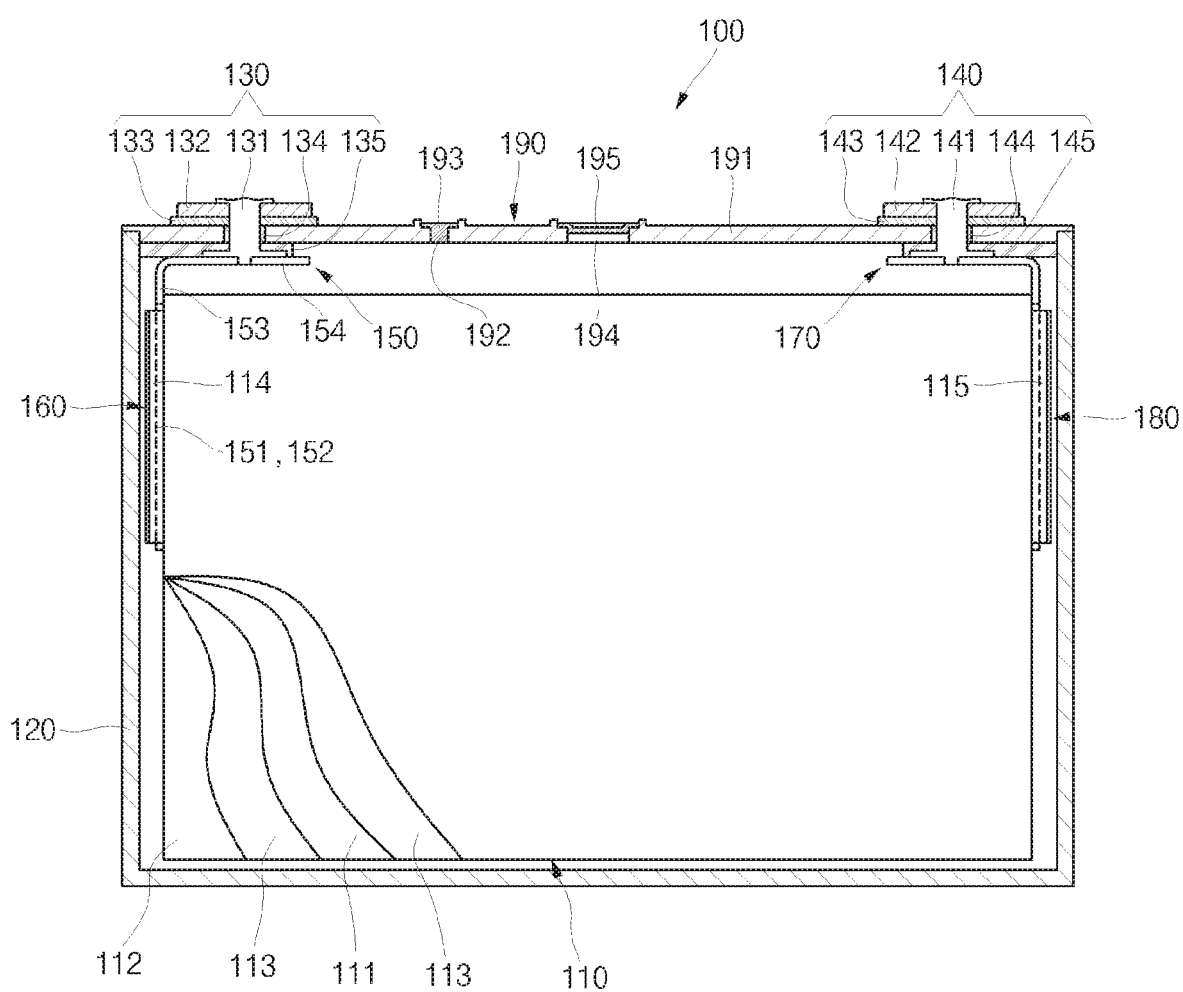
FIGS. 2A and 2B are a longitudinal sectional view and a transverse sectional view, respectively, of the secondary battery shown in FIG. 1.
Figure 2B:
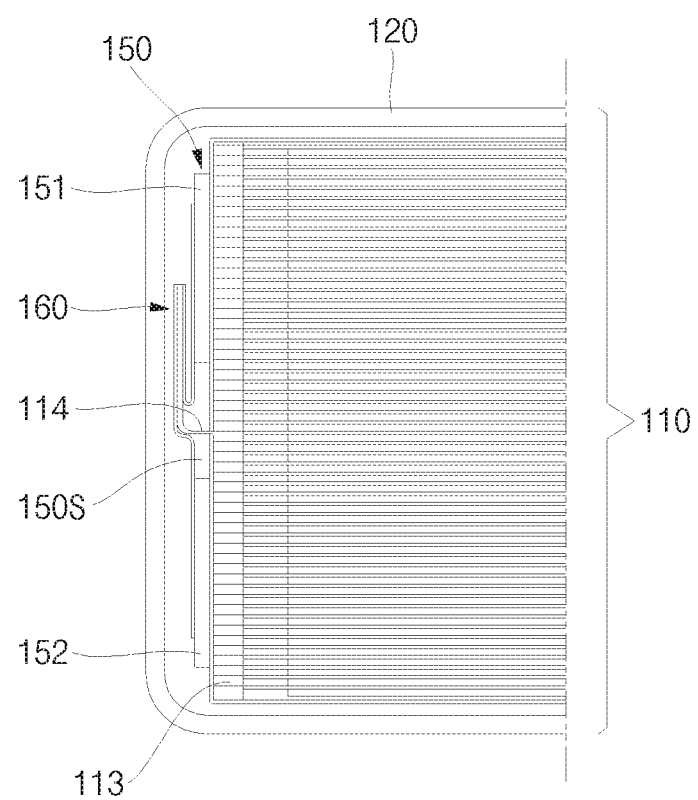

Referring to FIG. 1, a perspective view of a secondary battery 100 according to an embodiment of the present invention is illustrated. FIGS. 2A and 2B are a longitudinal sectional view and a transverse sectional view, respectively, of the secondary battery 100 shown in FIG. 1.

As illustrated in FIGS. 1, 2A, and 2B, the secondary battery 100 according to an embodiment of the present invention may include a stacked electrode assembly 110, a case 120 accommodating the electrode assembly 110, a first terminal part 130 electrically connected to one side of the electrode assembly 110 (e.g., electrically connected to a first main tab 114), a second terminal part 140 electrically connected to another side (e.g. the opposite side) of the electrode assembly 110 (e.g., electrically connected to a second main tab 115), a first current collecting member 150, a first sub-tab 160 interposed between the one side of the electrode assembly 110 and the first terminal part 130, a second current collecting member 170, a second sub-tab 180 interposed between the other side of the electrode assembly 110 and the second terminal part 140, and a cap assembly 190 coupled to an opening in the case 120.

The secondary battery 100 according to an embodiment of the present invention will be described in connection with a prismatic lithium ion secondary battery by way of example. However, the present invention is not limited to the example secondary battery disclosed herein, and the present invention can be applied to various types and shapes of batteries, including, for example, a lithium polymer battery.

Figure 4A:
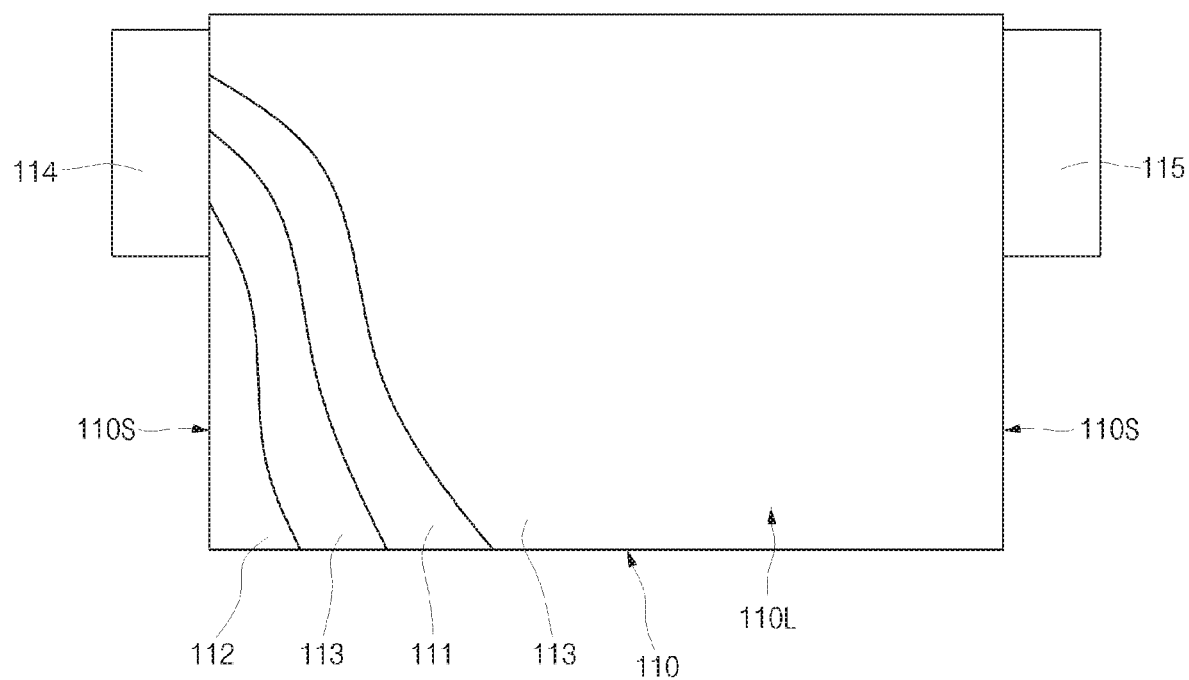
FIGS. 4A and 4B are a plan view and a perspective view, respectively, illustrating an electrode assembly of the secondary battery shown in FIG. 1 according to an embodiment of the present invention.
Figure 4B:
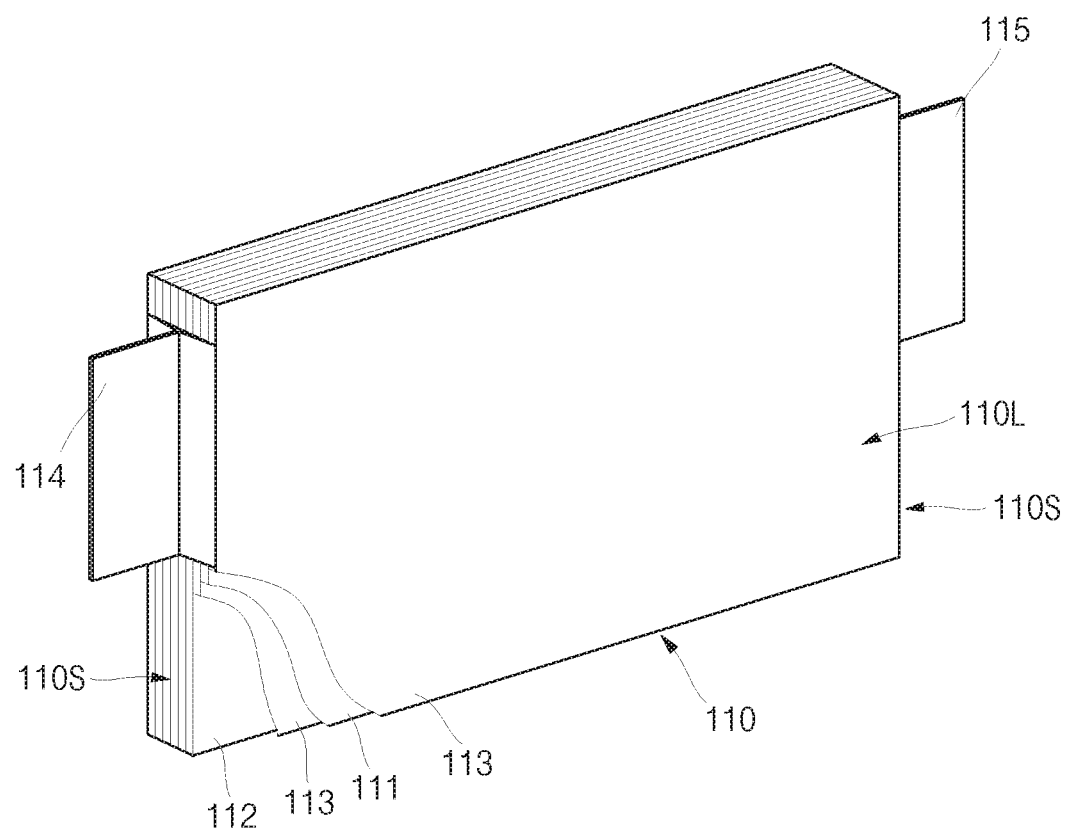

The electrode assembly 110 may be configured such that a first electrode plate 111, a second electrode plate 112, and a separator 113 interposed between the first electrode plate 111 and the second electrode plate 112 are stacked one on another (see, e.g., FIGS. 4A and 4B). For example, the electrode assembly 110 may have a rectangular parallelepiped shape in which the first electrode plate 111, the separator 113, and the second electrode plate 112 are sequentially stacked on each other rather than being formed in a jelly-roll shape in which the first electrode plate 111, the separator 113, and the second electrode plate 112 are wound. When the stacked electrode assembly 110 is combined with (e.g., is inserted into) the case 120, which has a substantially rectangular parallelepiped shape, there is little empty space between the electrode assembly 110 and the case 120, thereby considerably increasing the battery capacity.

In one embodiment, the first electrode plate 111 may operate as a negative electrode, and the second electrode plate 112 may operate as a positive electrode. The first and second electrode plates 111 and 112 are not limited thereto, and in other embodiments, the first electrode plate 111 may operate as the positive electrode and the second electrode plate 112 may operate as the negative electrode. For the sake of convenient explanation, an embodiment of the present invention will be described by way of example in which the first electrode plate 111 operates as the negative electrode and the second electrode plate 112 operates as the positive electrode.

The first electrode plate 111 may be formed by coating a first electrode active material, such as graphite or carbon, on a first electrode current collector formed of, for example, a metal foil, such as copper, a copper alloy, nickel, or a nickel alloy. The first electrode plate 111 may include a first main tab 114 (e.g., a first uncoated portion) without the first electrode active material coated thereon. The first main tab 114 becomes (or operates as) a path for the flow of current between the first electrode plate 111 and the first terminal part 130.

As illustrated in FIG. 2B, the first main tab 114 may protrude or extend (e.g., may protrude or extend a predetermined length) from one side of the electrode assembly 110 and may be bent to have a substantially L-shape. For example, the first main tab 114 may be inserted into the first sub-tab 160 and welded and may then be bent to have a substantially L-shape. The first main tab 114 of the electrode assembly 110 is substantially parallel with respect to the first electrode plate 111 at an initial stage (e.g., before being bent) and is then bent to have a substantially L-shape when it is combined with the first sub-tab 160. In the bent state, an end of the first main tab 114 may be substantially coplanar with an end of the first sub-tab 160, and in some embodiments, the end of the first main tab 114 may be exposed through (e.g., may extend beyond) the end of the first sub-tab 160.

The second electrode plate 112 may be formed by coating a second electrode active material, such as a transition metal oxide, on a second electrode current collector formed of, for example, a metal foil, such as aluminum or an aluminum alloy. The second electrode plate 112 may include a second main tab 115 (e.g., a second uncoated portion) without the second electrode active material coated thereon. The second main tab 115 becomes (or operates as) a path for the flow of current between the second electrode plate 112 and the second terminal part 140.

Similar to the first main tab 114, the second main tab 115 may protrude or extend (e.g., may protrude or extend a predetermined length) from one side of the electrode assembly 110 (e.g., an opposite side of the electrode assembly 110 from which the first main tab 114 protrudes or extends) and may be bent to have a substantially L-shape. For example, the second main tab 115 may be inserted into and welded to the second sub-tab 180 and may then be bent to have a substantially L-shape. The second main tab 115 of the electrode assembly 110 may be substantially planar at an initial stage (e.g., before being bent) and is then bent to have a substantially L-shape when it is combined with the second sub-tab 180. An end of the second main tab 115 may be substantially coplanar with an end of the second sub-tab 180, and in some embodiments, the end of the second main tab 115 may be exposed through (e.g., may extend beyond) the end of the second sub-tab 180.

The first main tab 114 and the second main tab 115 are configured such that they protrude or extend in horizontally opposite directions from the electrode assembly 110 before they are bent.

The separator 113 is positioned between the first electrode plate 111 and the second electrode plate 112 to prevent a short-circuiting therebetween and to allow lithium ions to move. The separator 113 may be formed of polyethylene, polypropylene, or a composite film including polyethylene and polypropylene. However, the present invention does not limit the material of the separator 113 to those disclosed herein. In some embodiments, the separator 113 may be replaced with a solid electrolyte.

The electrode assembly 110 may be accommodated in the case 120 with an electrolytic solution, for example. The electrolytic solution may include a lithium salt, such as $LiPF_6$ or $LiBF_4$, dissolved in an organic solvent, such as ethylene carbonate (EC), propylene carbonate (PC), diethyl carbonate (DEC), ethyl methyl carbonate (EMC), or dimethyl carbonate (DMC). In addition, the electrolytic solution may be in a liquid, a solid, or in a gel phase.

The case 120 may have a hollow rectangular parallelepiped shape having an opening (e.g., a top opening). The electrode assembly 110 may be inserted into the case 120 through the top opening in the case 120.

The first terminal part 130 is electrically connected to the first main tab 114 of the electrode assembly 110 through the first current collecting member 150 and the first sub-tab 160. The first terminal part 130 may include a first terminal pillar 131 passing through a cap plate 191 of the cap assembly 190, and the first current collecting member 150 is electrically connected to the first terminal pillar 131 within the case 120. In addition, the first sub-tab 160 is connected to the first current collecting member 150, and the first main tab 114 of the electrode assembly 110 is connected to the first sub-tab 160.

As illustrated in FIG. 2B, the first current collecting member 150 may make close contact with (e.g., may lie along or be substantially coplanar with) a side portion of the electrode assembly 110, and the first sub-tab 160 and the first main tab 114, which is welded to the first sub-tab 160, may be bent to extend in a direction substantially parallel with (e.g., may be bent to lie alongside or be substantially coplanar with) the first current collecting member 150.

The first current collecting member 150 may include a centrally formed slit 150S and a first region 151 and a second region 152 formed at opposite sides of the slit 150S. The first and second regions 151 and 152 may make close contact with (e.g., may lie along or may be substantially coplanar) a side portion of the electrode assembly 110. In addition, the first main tab 114, having passed through the slit 150S in the first current collecting member 150, may be combined with (e.g., may be inserted into) the first sub-tab 160, welded thereto, and may then be bent with the first sub-tab 160 to extend in a direction parallel with (e.g., to lie alongside or be substantially coplanar with) the first current collecting member 150 and the side portion of the electrode assembly 110. In addition, referring to FIG. 2A, the first current collecting member 150 may further include a third region 153 connecting the first and second regions 151 and 152 to each other (e.g., the third region 153 may extend between the first and second regions 151 and 152) and a fourth region 154 bent from the third region 153. The first current collecting member 150 and the first sub-tab 160 will be described later in more detail.

The first current collecting member 150 and the first sub-tab 160 may include (or may be made of) the same material as the first main tab 114. For example, when the first main tab 114 is made of a copper- or nickel-based material, the first current collecting member 150 and the first sub-tab 160 may also be made of a copper- or nickel-based material. Therefore, the first sub-tab 160 can be easily welded to the first current collecting member 150, and the first main tab 114 can be easily welded to the first sub-tab 160.

In addition, the first sub-tab 160 may be easily bendable. For example, because the first sub-tab 160 is to be bent into a substantially L-shape during the manufacture of the secondary battery 100, it should be flexible. Accordingly, the first sub-tab 160 may have a smaller thickness than the first current collecting member 150. The first sub-tab 160 has a greater thickness than the first main tab 114 and can be easily welded to the first main tab 114.

The second terminal part 140 is electrically connected to the second main tab 115 of the electrode assembly 110 through the second current collecting member 170 and the second sub-tab 180. The second terminal part 140 may include a second terminal pillar 141 passing through the cap plate 191 of the cap assembly 190, and the second current collecting member 170 is electrically connected to the second terminal pillar 141 within the case 120. In addition, the second sub-tab 180 is connected to the second current collecting member 170, and the second main tab 115 of the electrode assembly 110 is connected to the second sub-tab 180.

Similar to the first current collecting member 150, the second current collecting member 170 may make close contact with (e.g., may lie along or be substantially coplanar with) a side portion of the electrode assembly 110, and the second sub-tab 180 and the second main tab 115, which is inserted into and welded to the second sub-tab 180, may be bent to extend in a direction substantially parallel with (e.g., may be bent to lie alongside or be substantially coplanar with) the second current collecting member 170.

The second current collecting member 170 and the second sub-tab 180 may include (or may be made of) the same material as the second main tab 115. For example, when the second main tab 115 is made of an aluminum-based material, the second current collecting member 170 and the second sub-tab 180 may also be made of an aluminum-based material. Therefore, the second sub-tab 180 can be easily welded to the second current collecting member 170, and the second main tab 115 can be easily welded to the second sub-tab 180.

In addition, the second sub-tab 180 may be easily bendable. For example, because the second sub-tab 180 is to be bent in a substantially L-shape during the manufacture of the secondary battery 100, it should be flexible. Accordingly, the second sub-tab 180 may have a smaller thickness than the second current collecting member 170. The second sub-tab 180 has a greater thickness than the second main tab 115 and can be easily welded to the second main tab 115.

The cap plate 191 of the cap assembly 190 may have a planar panel shape. The cap plate 191 may be formed of a thin panel (or sheet) and coupled to the top opening in the case 120 to seal the case 120. The cap plate 191 includes an electrolyte injection opening 192 for injecting an electrolyte into the sealed case 120, and the electrolyte injection opening 192 is sealed by a sealing plug 193 after the electrolyte is injected into the sealed case 120. In addition, the cap plate 191 includes a vent opening 194 and a vent plate 195, which is configured to rupture when the internal pressure of the sealed case 120 exceeds a pressure (e.g., a preset or predetermined pressure), installed in the vent opening 194.

The first terminal part 130 may be positioned on the cap plate 191 and may include a first terminal plate 132 including (or made of), for example, aluminum, and coupled to the first terminal pillar 131, a first terminal upper insulation member 133 installed between the first terminal plate 132 and the cap plate 191, a first terminal seal gasket 134 interposed between the first terminal pillar 131 and the cap plate 191, and a first terminal lower insulation member 135 installed between a first current collecting member 150, which is connected to the first terminal pillar 131, and the cap plate 191.

The second terminal part 140 may be positioned on the cap plate 191 and may include a second terminal plate 142 including (or made of), for example, aluminum, and coupled to the second terminal pillar 141, a second terminal upper insulation member 143 installed between the second terminal plate 142 and the cap plate 191, a second terminal seal gasket 144 interposed between the second terminal pillar 141 and the cap plate 191, and a second terminal lower insulation member 145 installed between a second current collecting member 170, which is connected to the second terminal pillar 141, and the cap plate 191.

In some embodiments, the second terminal upper insulation member 143 may be replaced with a highly resistive conductor. In such an embodiment, the cap plate 191 and the case 120 may have the same polarity as the second terminal part 140. For example, the case 120 and the cap plate 191 of the secondary battery 100 may have (or may be charged with) a positive polarity.

In addition, the first and second terminal parts 130 and 140 are described by way of example for a better understanding of the present invention, and it will be understood by one skilled in the art that the first and second terminal parts 130 and 140 can be modified to have various suitable types and configurations.

As described above, in the secondary battery 100 according to an embodiment of the present invention, the first and second current collecting members 150 and 170 make close contact with (e.g., lie alongside or are substantially coplanar with) left and right side portions of the electrode assembly 110. The first and second main tabs 114 and 115 pass through the first and second current collecting members 150 and 170 to be inserted into and welded to the first and second sub-tabs 160 and 180, respectively, and then the first and second main tabs 114 and 115 are bent with the first and second sub-tabs 160 and 180 to make close contact with the first and second current collecting members 150 and 170, respectively. Accordingly, spaces occupied by the first and second main tabs 114 and 115 (e.g., the first and second uncoated portions) between the electrode assembly 110 and the case 120 can be reduced or minimized. Therefore, in the secondary battery 100 according to an embodiment of the present invention, the size of the electrode assembly 110 can be increased as much as the reduced spaces between the electrode assembly 110 and the case 120, thereby further increasing the battery capacity.

Figure 3:
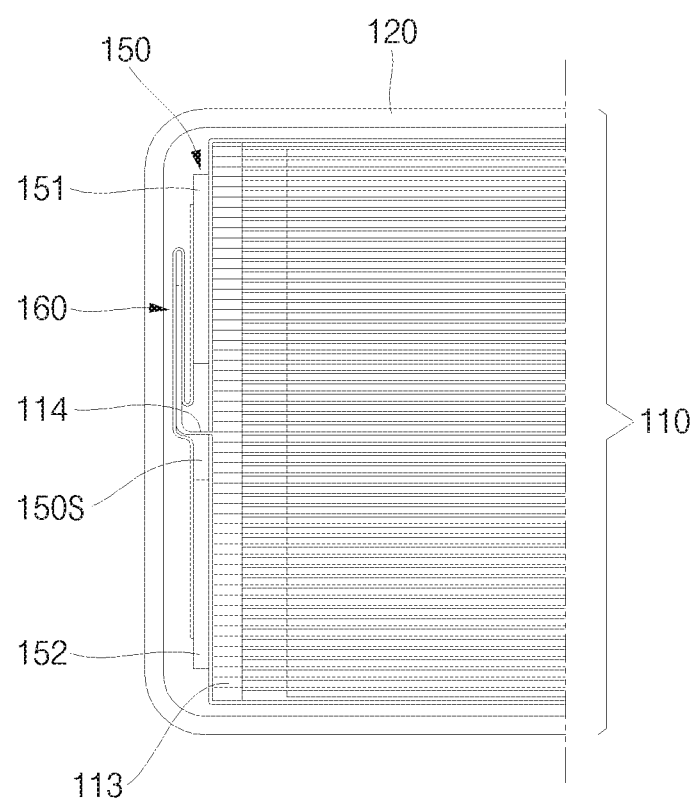
FIG. 3 is a transverse sectional view of the secondary battery shown in FIG. 1 according to another embodiment of the present invention.

Referring to FIG. 3, a transverse sectional view of the secondary battery shown in FIG. 1 according to another embodiment of the present invention is illustrated.

As illustrated in FIG. 3, ends of the first sub-tab 160 may be connected to each other without being cut. For example, whereas ends of the first sub-tab 160 illustrated in FIG. 2B are cut to expose the first main tab 114 through the cut ends of the first sub-tab 160, the ends of the first sub-tab 160 illustrated in FIG. 3 are not cut and the first main tab 114 is not exposed through the ends of the first sub-tab 160. In other words, the first main tab 114 is configured such that the end thereof is covered by the first sub-tab 160. For example, the first sub-tab 160 is formed to have a substantially inverted U-shape into which the first main tab 114 is inserted.

As described above, in the secondary battery 100 according to an embodiment of the present invention, because a step of cutting the ends of the first sub-tab 160 and the second sub-tab 180 can be omitted, the manufacturing process of the secondary battery 100 can be further simplified, thereby reducing the manufacturing cost.

Referring to FIGS. 4A and 4B, a plan view and a perspective view, respectively, illustrating an electrode assembly 110 in the secondary battery 100 according to an embodiment of the present invention are illustrated.

As illustrated in FIGS. 4A and 4B, the electrode assembly 110 may include a pair of planar long-side regions 110L and four short-side regions 110S connecting (e.g., extending between) the planar long-side regions 110L. The first main tab 114 extends from one short-side region 110S, and the second main tab 115 extends from another short-side region 110S facing the one short-side region 110S (e.g., an opposite short-side region 110S).

The first main tab 114 includes a plurality of first main tabs, which are portions extending from (e.g., which are extended or protruding portions of) the first electrode plates 111. For example, the first main tabs 114 are portions of the first electrode current collector of the first electrode plates 111 without the first electrode active material coated thereon (e.g., the first main tabs 114 are uncoated portions of the first electrode current collector of the first electrode plates 111). The plurality of first main tabs 114 is compressed into a single unit, which is then inserted into and welded to the first sub-tab 160.

In addition, the second main tab 115 includes a plurality of second main tabs, which are portions extending from (e.g., which are extended or protruding portions of) the second electrode plates 112. For example, the second main tabs 114 are portions of the second electrode current collector of the second electrode plates 112 without the second electrode active material coated thereon (e.g., the second main tabs 114 are uncoated portions of the second electrode current collector of the second electrode plates 112). The plurality of second main tabs 115 is compressed into a single unit, which is then inserted into and welded to the second sub-tab 180.

The first and second main tabs 114 and 115 illustrated in FIGS. 4A and 4B are yet to be inserted into the first and second sub-tabs 160 and 180.

Figure 5A:
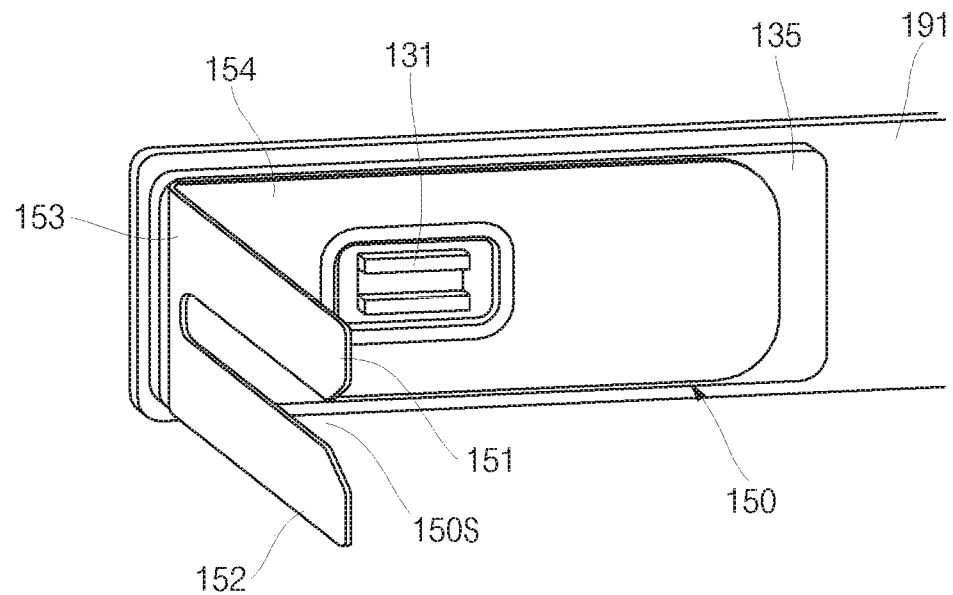
FIGS. 5A and 5B are perspective views illustrating a connection relationship between a current collecting member and a sub-tab in the secondary battery shown in FIG. 1 according to an embodiment of the present invention.
Figure 5B:
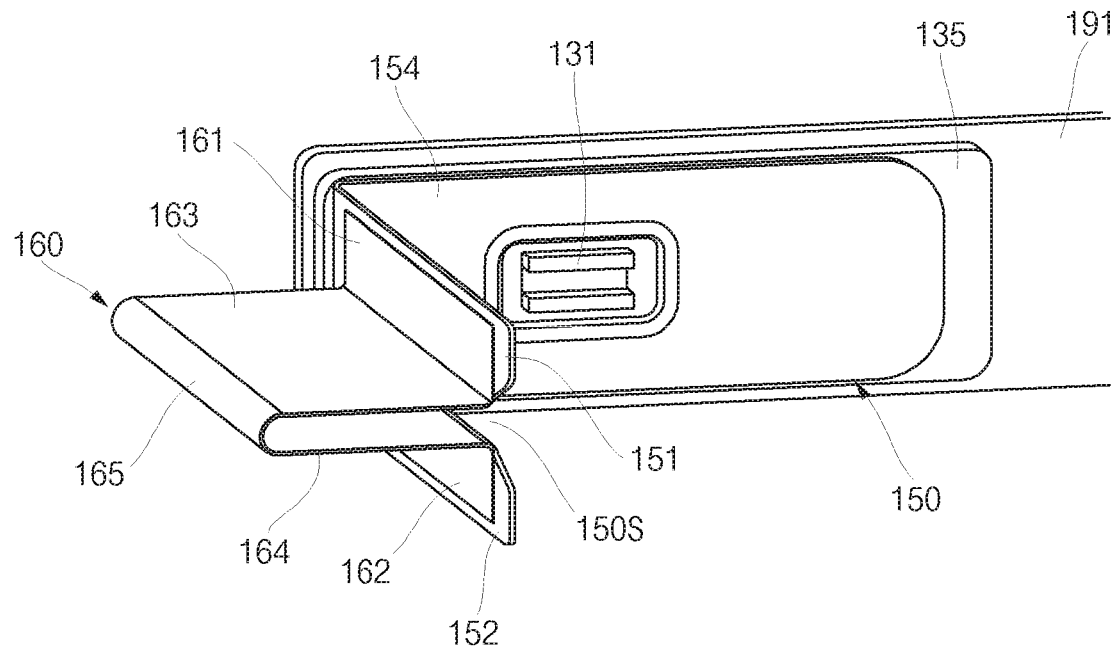

Referring to FIGS. 5A and 5B, perspective views illustrating a connection relationship between a current collecting member 150 and a sub-tab 160 in the secondary battery 100 according to an embodiment of the present invention is illustrated. The current collecting member 150 may represent the first current collecting member 150, the sub-tab 160 may represent the first sub-tab 160, and the main tab 114 may represent the first main tab 114. The current collecting member 150, the sub-tab 160, and the main tab 114 may also represent the second current collecting member 170, the second sub-tab 180, and the second main tab 115, respectively. Put another way, the first and second current collecting members 150 and 170 may have the same or substantially similar configurations, the first and second sub-tabs 160 and 180 may have the same or substantially similar configurations, and the first and second main tabs 114 and 115 may have the same or substantially similar configurations.

First, as illustrated in FIG. 5A, the current collecting member 150 may make close contact with the cap plate 191 (e.g., may make close contact with an inner surface of the cap plate 191) and may include the slit 150S formed to allow the main tab 114 to pass therethrough.

In addition, the current collecting member 150 may include a first region 151, formed at one side of the slit 150S and making close contact with the short-side region 110S of the electrode assembly 110, and a second region 152, formed at the other side of the slit 150S and making close contact with the short-side region 110S of the electrode assembly 110.

Moreover, the current collecting member 150 may further include a third region 153 connected to (e.g., extending between) the first and second regions 151 and 152 and making close contact with the short-side region 110S.

Additionally, the current collecting member 150 may further include a fourth region 154 bent from the third region 153, making close contact with the first terminal lower insulation member 135, and connected with the first terminal pillar 131.

Next, as illustrated in FIG. 5B, the sub-tab 160 may include a first section 161 welded to the first region 151 of the current collecting member 150, a second section 162 welded to the second region 152 of the current collecting member 150, a third section 163 bent to extend from the first section 161 and welded to one surface of the main tab 114, a fourth section 164 bent to extend from the second section 162 and welded to the other surface of the main tab 114, and a fifth section 165 connecting (e.g., extending between) the third and fourth sections 163 and 164. Together, the third, fourth, and fifth sections 163, 164, and 165 of the sub-tab 160 may form a substantially C-shape. The third, fourth, and fifth sections 163, 164, and 165 may be collectively referred to as holding parts for the main tab 114.

After the main tab 114 is inserted into the third, fourth, and fifth sections 163, 164, and 165 of the sub-tab 160, welding is performed to connect (e.g., electrically connect) the main tab 114 to the sub-tab 160.

After the welding, some regions of the third and fourth sections 163 and 164 and the fifth section 165 may be removed (e.g., may be cut out) from the sub-tab 160 in such a way that ends of the third and fourth sections 163 and 164 of the sub-tab 160 may be made to be coplanar with an end of the main tab 114.

Figure 6:
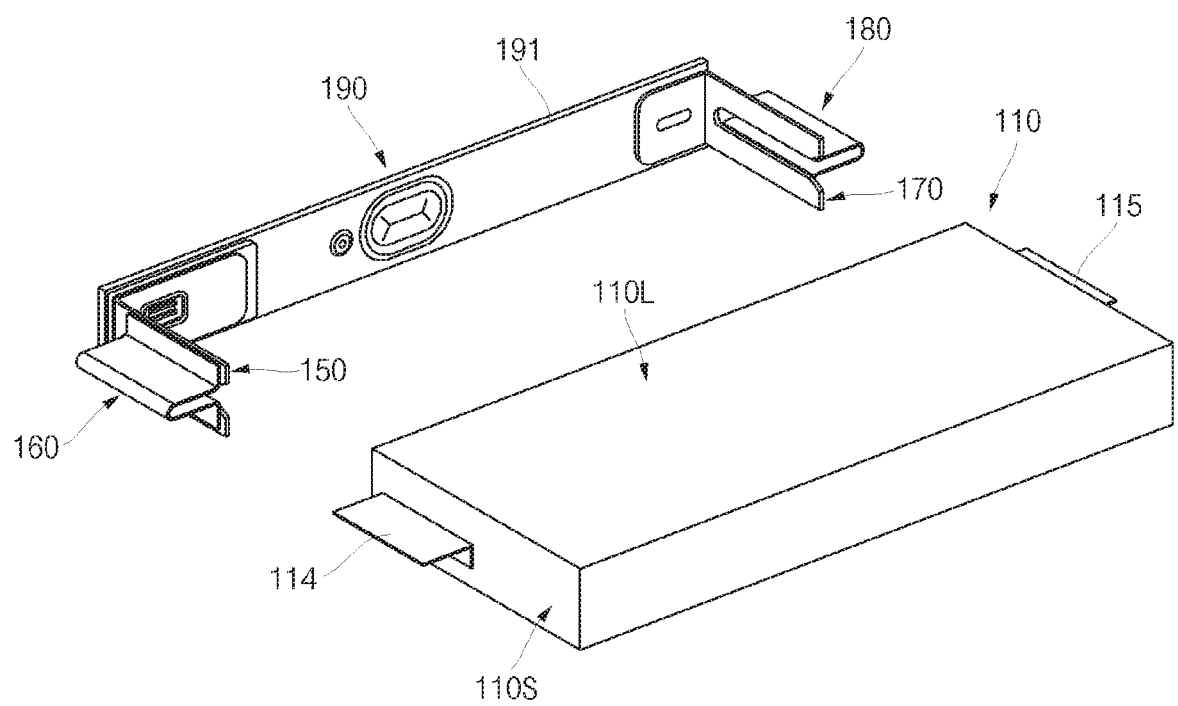
FIG. 6 is a perspective view illustrating a connection relationship between a cap assembly and the electrode assembly in the secondary battery according to an embodiment of the present invention.

Referring to FIG. 6, a perspective view illustrating a connection relationship between a cap assembly 190 and an electrode assembly 110 of the secondary battery 100 according to an embodiment of the present invention is illustrated.

As illustrated in FIG. 6, the first and second sub-tabs 160 and 180, which are bendable and flexible, may be connected to the first current collecting member 150 and the second current collecting member 170, respectively, and the first and second main tabs 114 and 115 of the electrode assembly 110 may be coupled to the first and second sub-tabs 160 and 180 in a sliding manner, respectively (e.g., the first and second sub-tabs 160 and 180 and the first and second main tabs 114 and 115 may be moved relative to each other such that the first and second main tabs 114 and 115 are slid into the first and second sub-tabs 160 and 180, respectively).

Here, the first and second current collecting members 150 and 170 may make close contact with opposite short-side regions 110S of the electrode assembly 110. The first current collecting member 150 may be in electrical contact with the first main tab 114 but may not be in electrical contact with (e.g., may be electrically insulated from) the second electrode plate 112 due to the separator 113. The second current collecting member 170 may be in electrical contact with the second main tab 115 but may not be in electrical contact with (e.g., may be electrically insulated from) the first electrode plate 111 due to the separator 113.

Figure 7A:
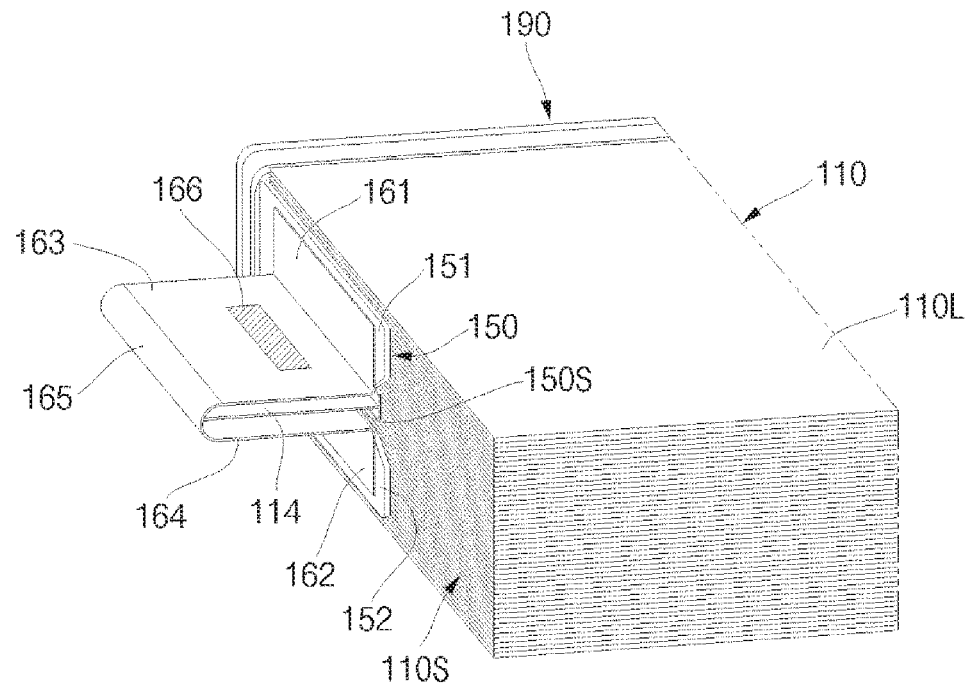
FIGS. 7A-7C are perspective views illustrating a manufacturing method of a secondary battery according to an embodiment of the present invention.
Figure 7B:
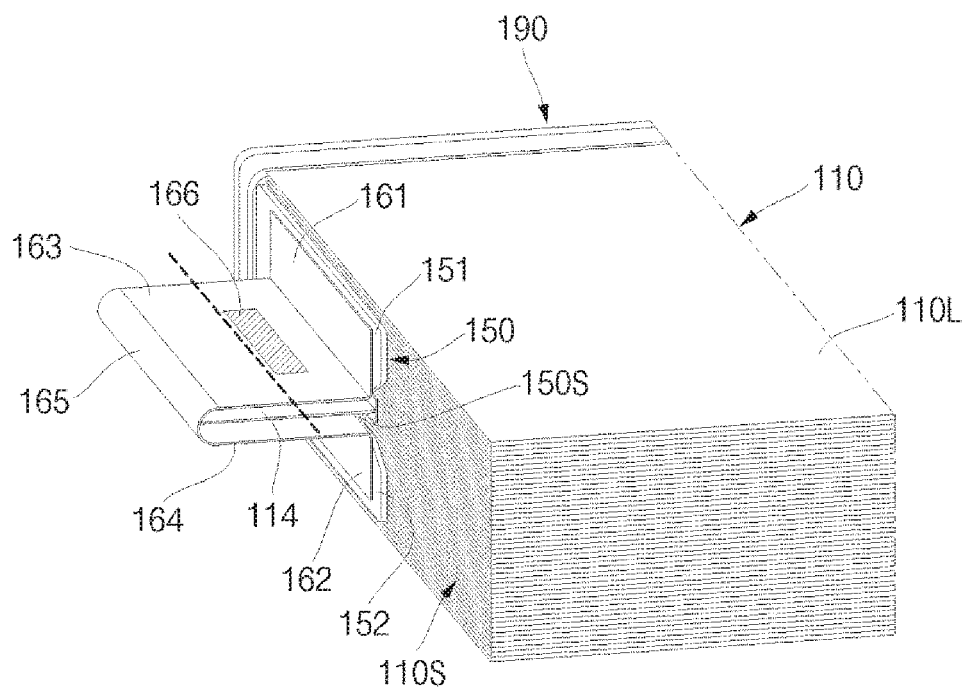
Figure 7C:
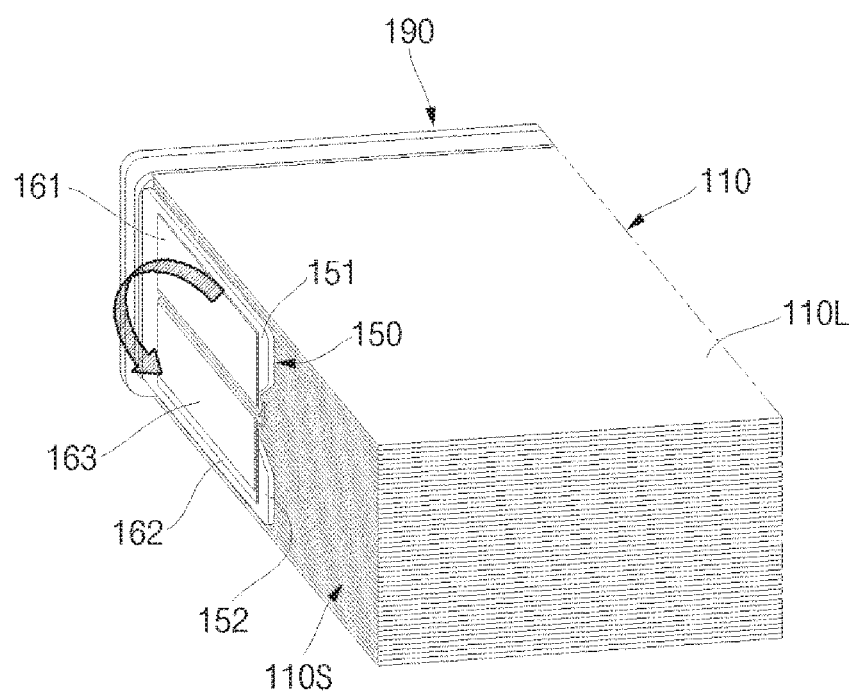

Referring to FIGS. 7A-7C, perspective views illustrating a manufacturing method of a secondary battery 100 according to an embodiment of the present invention are illustrated.

As illustrated in FIG. 7A, the main tab 114 may be welded to the sub-tab 160 by, for example, ultrasonic welding, resistance welding or laser welding, in a state in which the main tab 114 extends through the slit 150S in the current collecting member 150 and is inserted into the sub-tab 160. The type of welding is not limited to those listed above. For example, the main tab 114 may be inserted between the third and fourth sections 163 and 164 of the sub-tab 160 and then the main tab 114 may be welded to the sub-tab 160 at one or both of the third and fourth sections 163 and 164 of the sub-tab 160, thereby achieving welding in a state in which the main tab 114 is inserted into a region between the third and fourth sections 163 and 164 of the sub-tab 160. Therefore, the third and fourth sections 163 and 164 of the sub-tab 160 and the main tab 114 may be electrically connected to each other through a welding region 166.

As illustrated in FIG. 7B, regions of the sub-tab 160 may be cut by a cutting tool. For example, regions of the sub-tab 160 residing outside the welding region 166, that is, some regions of the third and fourth sections 163 and 164 and the fifth section 165, may be cut by a cutting tool. As the result of the cutting, ends of the third and fourth sections 163 and 164 of the sub-tab 160 and an end of the main tab 114 may be coplanar.

In some embodiments, the cutting of the sub-tab 160 may be omitted. For example, in an embodiment in which the end of the sub-tab 160 does not extend beyond the long-side region 110L of the electrode assembly 110 when the sub-tab 160 is bent, the cutting of the sub-tab 160 may not be performed or may be omitted.

In FIG. 7B, when the sub-tab 160 is bent to extend in a direction parallel with the current collecting member 150, the end of the sub-tab 160 may extend beyond the long-side region 110L of the electrode assembly 110. Thus, the end of the sub-tab 160 may be cut such that the end of the sub-tab 160 does not extend beyond the long-side region 110L of the electrode assembly 110. In FIG. 7B, the dotted line is a cutting line.

As illustrated in FIG. 7C, the welded sub-tab 160 may be bent to extend in a direction substantially parallel with the current collecting member 150 to make close contact with (e.g., the welded sub-tab 160 may be bent to lie alongside or to be substantially coplanar with) the current collecting member 150. For example, the main tab 114 protrudes from (e.g., extends from) the short-side regions 110S of the electrode assembly 110 and is inserted into and welded to the sub-tab 160, and the sub-tab 160 and the main tab 114 are bent to extend in a substantially parallel direction with respect to (e.g., are bent to lie alongside or to be substantially coplanar with) the current collecting member 150 and/or the short-side regions 110S of the electrode assembly 110, thereby making close contact with the current collecting member 150 and/or the short-side regions 110S of the electrode assembly 110.

As described above, the secondary battery 100 according to an embodiment of the present invention can reduce or minimize a space occupied by the main tab 114 (e.g., the uncoated portion) between the case 120 and the electrode assembly 110, thereby increasing battery capacity.

Figure 8A:
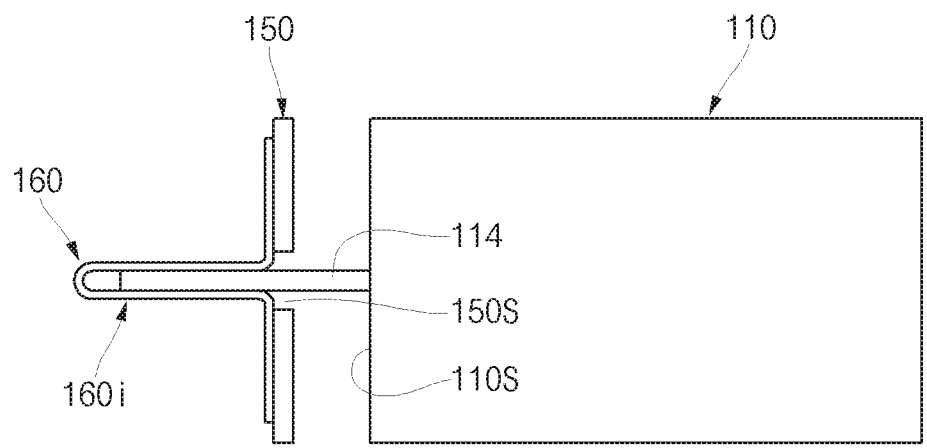
FIGS. 8A and 8B are transverse sectional views illustrating constructional relationships between an electrode assembly, a current collecting member, and a sub-tab in a secondary battery according to various embodiments of the present invention.
Figure 8B:
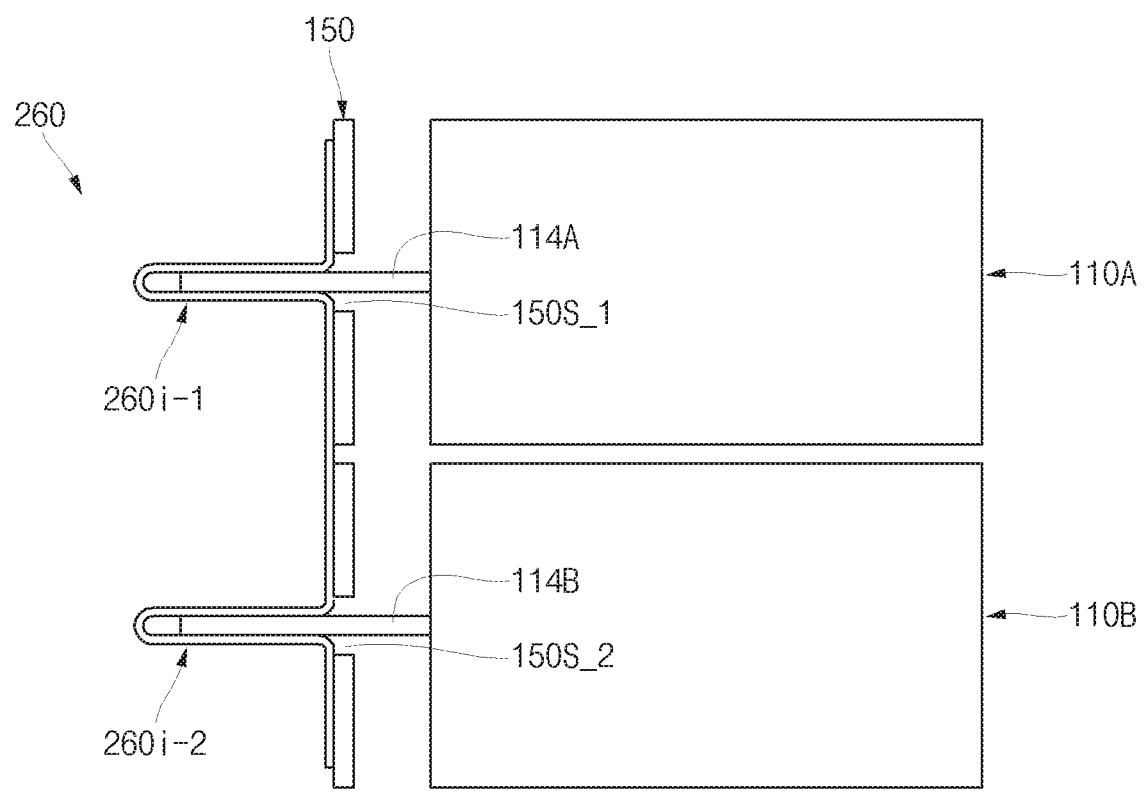

Referring to FIGS. 8A and 8B, transverse sectional views illustrating constructional relationships among an electrode assembly, a current collecting member, and a sub-tab in a secondary battery 100 according to various embodiments of the present invention are illustrated.

First, as illustrated in FIG. 8A, an electrode assembly 110 may include a single unit (e.g., a single electrode assembly). In this embodiment, a main tab 114 protruding/extending from short-side regions 110S of the electrode assembly 110 may pass through a slit 150S in a current collecting member 150 to be within a space between each of third, fourth, and fifth sections of a sub-tab 160 to be coupled thereto. Here, regions including the third, fourth, and fifth sections of the sub-tab 160 may be defined as holding parts 160$i$. The main tab 114 may be inserted into the holding parts 160$i$ of the sub-tab 160 to then be coupled thereto.

Next, as illustrated in FIG. 8B, the electrode assembly 110 may include a first electrode assembly 110A having a first main tab 114A and a second electrode assembly 110B having a second main tab 114B. The current collecting member 150 may include a first slit 150S_1 through which the first main tab 114A passes and a second slit 150S_2 through which the second main tab 114B passes. The sub-tab 260 may include a first holding part 260$i$_1 into which the first main tab 114A is inserted to be welded to the sub-tab 260 and a second holding part 260$i$_2 into which the second main tab 114B is inserted to be welded to the sub-tab 260. As the number of electrode assemblies increases, the number of sub-tab holding parts also increases.

According to embodiments of the present invention, the sub-tab 260 coupled with the first and second main tabs 114A and 114B, that is, the holding parts 260$i$_1 and 260$i$_2, may be bent in one direction, thereby reducing or minimizing the space between the electrode assembly 110 and the case 120 and increasing the battery capacity.

While the present invention has been described with reference to example embodiments thereof, it will be understood by those of ordinary skill in the art that various changes in form and details may be made therein without departing from the spirit and scope of the present invention as defined by the following claims and their equivalents.

| Explanation of Some Reference Numerals | |
|---|---|
| 100: Secondary battery | |
| 110: Electrode assembly | 120: Case |
| 130: First terminal part | 140: Second terminal part |
| 150: First current collecting member | 150S: Slit |
| 151: First region | 152: Second region |
| 153: Third region | 154: Fourth region |
| 160: First sub-tab | 161: First section |
| 162: Second section | 163: Third section |
| 164: Fourth section | 165: Fifth section |
| 166: Welding region | |
| 170: Second current collecting member | |
| 180: Second sub-tab | 190: Cap assembly |

What is claimed is:

1. A secondary battery comprising:
an electrode assembly having a length in a first direction, a height in a third direction, and a width in a second direction, the height of the electrode assembly being smaller than the length of the electrode assembly and larger than the width of the electrode assembly, the electrode assembly comprising a main tab extending from the electrode assembly in the first direction;

a current collecting member adjacent the main tab; and a sub-tab electrically connecting the main tab to the current collecting member, the main tab being inserted and welded to the sub-tab, wherein both the sub-tab and the main tab being are bent in the second direction such that a distal end portion of the main tab extends in the second direction on a surface of the current collecting member facing in the first direction.

2. The secondary battery of claim 1, wherein the sub-tab and the main tab are bent to extend in the second direction parallel to an extension direction of the current collecting member.

3. The secondary battery of claim 1, wherein the electrode assembly comprises a plurality of first and second electrode plates and separators stacked on each other and has a pair of long-side regions and a short-side region extending between the long-side regions, wherein the main tab is an uncoated portion of one of the plurality of first electrode plates or the plurality of second electrode plates and extends from the short-side region of the electrode assembly, and wherein the current collecting member contacts the short-side region of the electrode assembly and has a slit through which the main tab passes.

4. The secondary battery of claim 3, wherein the current collecting member comprises:

a first region at one side of the slit and contacting the short-side region of the electrode assembly;

a second region at another side of the slit and contacting the short-side region of the electrode assembly; and a third region extending between the first and second regions and contacting the short-side region of the electrode assembly.

5. The secondary battery of claim 4, wherein the sub-tab comprises:

a first section welded to the first region of the current collecting member;

a second section welded to the second region of the current collecting member;

a third section extending from the first section and welded to one surface of the main tab; and a fourth section extending from the second section and welded to another surface of the main tab.

6. The secondary battery of claim 5, wherein the third and fourth sections of the sub-tab are bent to extend in the second direction parallel to an extension direction of the first region or an extension direction of the second region of the current collecting member.

7. The secondary battery of claim 5, wherein the third and fourth sections of the sub-tab are coplanar with the distal end portion of the main tab.

8. The secondary battery of claim 5, wherein the sub-tab further comprises a fifth section extending between ends of the third and fourth sections of the sub-tab.

9. The secondary battery of claim 1, wherein the sub-tab has a greater thickness than the main tab and a smaller thickness than the current collecting member.

10. The secondary battery of claim 1, wherein the electrode assembly comprises a first electrode assembly comprising a first main tab and a second electrode assembly comprising a second main tab, wherein the current collecting member has a first slit through which the first main tab passes and a second slit through which the second main tab passes, and wherein the sub-tab comprises a first holding part into which the first main tab is inserted and a second holding part into which the second main tab is inserted.

* * * * *

UNITED STATES PATENT AND TRADEMARK OFFICE
CERTIFICATE OF CORRECTION

PATENT NO. : 11,342,636 B2
APPLICATION NO. : 16/179684
DATED : May 24, 2022
INVENTOR(S) : Hyun Soo Lee et al.

It is certified that error appears in the above-identified patent and that said Letters Patent is hereby corrected as shown below:

In the Claims

Column 13, Line 5, Claim 1      After "tab" delete "being"

Signed and Sealed this
Twenty-fifth Day of July, 2023

*Katherine Kelly Vidal*
Katherine Kelly Vidal
*Director of the United States Patent and Trademark Office*